United States Patent

[11] 3,586,958

| [72] | Inventor | Wilhelm Kafka |
| | | Tennenlohe, Germany |
| [21] | Appl. No. | 809,882 |
| [22] | Filed | Mar. 24, 1969 |
| [45] | Patented | June 22, 1971 |
| [73] | Assignee | Siemens Aktiengesellschaft |
| | | Berlin and Munich, Germany |
| [32] | Priority | Mar. 30, 1968 |
| [33] | | Germany |
| [31] | | P1763073.8 |

[54] DC TRANSMISSION DEVICE FOR SUPERCONDUCTIVE CABLE
10 Claims, 2 Drawing Figs.

[52] U.S. Cl............................................ 321/8R, 321/9, 333/76
[51] Int. Cl............................................ H02m 1/12
[50] Field of Search............................................ 321/8, 9, 10; 333/76

[56] References Cited
UNITED STATES PATENTS

| 1,722,207 | 7/1929 | Geise | 333/76 X |
| 2,031,103 | 2/1936 | George | 333/76 X |
| 2,263,376 | 11/1941 | Blumlein et al. | 333/76 X |
| 2,594,019 | 4/1952 | Holman | 321/10 X |
| 3,461,372 | 8/1969 | Pickup et al. | 333/76 X |
| 3,501,686 | 3/1970 | Tveteras et al. | 321/9 |
| 2,982,928 | 5/1961 | Kall | 333/76 X |

Primary Examiner—William M. Shoop, Jr.
Attorneys—Curt M. Avery, Arthur E. Wilfond, Herbert L. Lerner and Daniel J. Tick ABSTRACT: Current converters subjected to an upper harmonic voltage are coupled to each end of a superconductive cable via corresponding voltage dividers. Each voltage divider comprises a smoothing inductor, having a low resistance to direct current, coupled to the corresponding converter and a capacitor and an inductor, having a high resistance to direct current, connected to a point at ground potential. The capacitors comprise superconductive material of the cable, covered by electrically insulating material which in turn is covered by inductive material.

DC TRANSMISSION DEVICE FOR SUPERCONDUCTIVE CABLE

DESCRIPTION OF THE INVENTION

The present invention relates to a DC transmission device. More particularly, the invention relates to a DC transmission device for a superconductive cable.

The financial investment and operating costs of a superconductive DC cable depend upon whether the energy losses occurring in the cable are less than the heat which penetrates the cable from its environment. The heat may be reduced by appropriate heat insulation to a few watts per kilometer. A cooling factor of 500 provides a countercooling energy of several kilowatts per kilometer. A cooling factor of 500 means that in order to cool or dissipate the heat losses from a temperature level of 4.2° K., approximately 500 times the compressor capacity is required in the cooling plant. If the losses occurring in the cable are as great as the penetrating heat, the efficiency of the cooling plants and the cost of operation thereof would not only increase twofold, but the distance between the cooling plants would also have to be decreased to one-half.

During normal operation, losses which occur in the superconductive DC cable are caused by upper harmonic waves. These losses comprise AC losses in the superconductive material of the cable, eddy current losses in the normal conductive material of the cable and dielectric losses of the electrical and heat insulating material of the cable. Since the cable is supplied by AC to DC converters, it is impossible to completely avoid upper harmonic waves. Smoothing inductors are connected to the transmission line of high-voltage direct currents via normally conductive conductors in order to decrease the alternating current. The upper harmonic voltage, however, is not reduced in the conductor to less than the magnitude of that of the converters, since in normally conductive conductors the dielectric losses are negligible. In superconductive cables, however, an upper harmonic voltage of a few per cent of the direct voltage, is high detrimental, since the resultant dielectric losses and the losses caused by the capacitive alternating current in the cable, multiplied by the cooling factor of 500, are highly adverse to operating economy. It must also be taken into account, during the transmission of high-voltage direct currents via superconductive conductors, that upper harmonic waves produced by a rectifier at one end of the cable and by an inverter at the other end of the cable are so related to each other in phase that the superconductive cable functions as a no load or open voltage cable of half length with regard to the upper harmonic waves. The upper harmonic voltages would thus increase from both ends of the superconductive cable toward the middle of said cable. The smoothing inductors connected to the normally conductive conductors are therefore incapable of reducing the dielectric losses in a superconductive cable. On the contrary, the greater the inductivity of the smoothing inductors, the greater the dielectric losses of the cable.

The principal object of the present invention is to provide a new and improved superconductive cable which functions with low losses and therefore great economy.

An object of the present invention is to provide a superconductive cable which overcomes the disadvantages of known types of superconductive cable.

An object of the present invention is to provide a DC transmission device for a superconductive cable which reduces cable losses occurring at low temperatures to such an extent that such losses become negligible in comparison with penetrating heat.

An object of the present invention is to provide a DC transmission device for superconductive cable which decreases the magnitude of the upper harmonic voltage to a considerable extent.

In accordance with the present invention, a DC transmission device for a superconductive cable having two ends comprises current converter means coupled to each end of the cable. The current converter means produces an upper harmonic voltage. Voltage divider means is interposed and coupled between each end of the cable and the corresponding current converter means for decreasing the upper harmonic voltage at the cable to a fraction of the upper harmonic voltage at the current converter means. The voltage divider means has a part having a low resistance to direct current coupled to the corresponding current converter means and another part having a high resistance to direct current connected to a point at ground potential. The other part is connected to the corresponding end of the cable whereby the voltage at the cable is substantially unaffected by the voltage divider means.

The voltage divider means comprises smoothing inductances, inductive reactances and capacitive reactances. The voltage divider means comprises a plurality of voltage dividers each comprising a smoothing inductor and a capacitor and an inductor connected in series circuit arrangement between the cable and a point at ground potential.

Compensating means is connected to the cable at intervals of less than one-quarter wavelength. The compensating means comprises a plurality of compensators each comprising a capacitor and an inductor connected in series circuit arrangement between the cable and a point at ground potential. The smoothing inductor of each voltage divider couples the corresponding voltage divider to the current converter means.

The cable comprises a superconductive material, electrically insulating material covering the superconductive material and normally conductive material covering the insulating material. The capacitor of each of the voltage dividers comprises the superconductive, insulating and normally conductive materials, as does the capacitor of each of the compensators.

In order that the present invention may be readily carried into effect, it will now be described with reference to the accompanying drawing, wherein.

Figure 1:
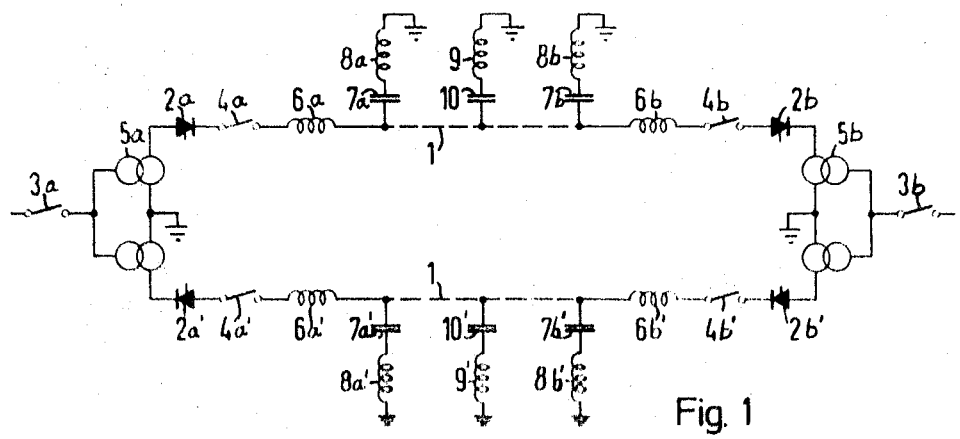
FIG. 1 is a circuit diagram of an embodiment of the DC transmission device of the present invention for a superconductive cable.

In FIG. 1, current converters $2a$, $2a'$, $2b$ and $2b40$ are coupled to corresponding ends of a superconductive cable 1. A switch $3a$ and a current transformer $5a$ are connected to the converters $2a$ and $2a'$ at one end of the superconductive cable 1. A switch $3b$ and a current transformer $5b$ are connected to the converters $2b$ and $2b'$ at the other end of the superconductive cable 1.

The converter $2a$ is coupled to the corresponding end of the superconductive cable 1 via a switch $4a$ and a voltage divider $6a$, $7a$, $8a$. The converter $2a'$ is coupled to the corresponding end of the superconductive cable 1 via a switch $4a'$ and a voltage divider $6a'$, $7a'$, $8a'$. The converter $2b$ is coupled to the corresponding end of the superconductive cable 1 via a switch $4b$ and a voltage divider $6b$, $7b$, $8b$. The converter $2b'$ is coupled to the corresponding end of the superconductive cable 1 via a switch $4b'$ and a voltage divider $6b'$, $7b'$, $8b'$.

Each of the inductors $6a$, $6a'$, $6b$, $6b'$ functions as a smoothing inductor and preferably comprises a superconductive coil. The voltage divider $6a$, $7a$, $8a$ comprises a smoothing inductor $6a$, and a capacitor $7a$ connected in series circuit arrangement with an inductor $8a$ between a common point in the connection between the smoothing inductor $6a$ and the superconductive cable 1 and a point at ground potential. The voltage divider $6a'$, $7a'$, $8a'$ comprises a smoothing inductor $6a'$, and a capacitor $7a'$ connected in series circuit arrangement with an inductor $8a'$ between a common point in the connection between the smoothing inductor $6a'$ and the superconductive cable 1 and a point at ground potential. The voltage divider $6b$, $7b$, $8b$ comprises a smoothing inductor $6b$, and a capacitor $7b$ connected in series circuit arrangement with an inductor $8b$ between a common point in the connection between the smoothing inductor $6a'$ and the superconductive cable 1 and a point at ground potential. The voltage divider 6b, 7b, 8b comprises a smoothing inductor 6b, and a capacitor 7b connected in series circuit arrangement with an inductor 8b between a common point in the connection between the smoothing inductor 6b and the superconductive cable 1 and a point at ground potential. The voltage divider 6b', 7b', 8b' comprises a smoothing inductor 6b', and a capacitor 7b' connected in series circuit arrangement with an inductor 8b' between a common point in the connection between the smoothing inductor 6b' and the superconductive cable 1 and a point at ground potential.

The series circuit arrangement of a capacitor and an inductor, connected to ground, of each of the voltage dividers, functions as a high resistance to direct current and effectively blocks such direct current. The smoothing inductor of each of the voltage dividers functions as a low resistance to direct current and effectively conducts such direct current. Each of the inductors 8a, 8a', 8b, 8b' of the voltage dividers functions as a choke and has fewer losses than an ohmic resistance. The inductivities of the inductors 6a and 8a, 6a' and 8a', 6b and 8b, and 6b' and 8b' of the voltage dividers are preferably such that the upper harmonic voltages in the superconductive cable 1 will be sufficiently small. Such upper harmonic voltages will preferably amount to 10 percent of the upper harmonic voltage at the current converter, or less. The capacitor and inductor 7a and 8a, 7a' and 8a', 7b and 8b and 7b' and 8b' of each of the voltage dividers may be at the lower cable temperature or at normal room temperature.

In order to prevent the remaining upper harmonic voltage at the ends of the cable from becoming too high in magnitude, due to the Ferranti effect, it is highly advantageous, especially with long cables, to connect compensating circuits to the cable at intervals of less than one-quarter wavelength. The Ferranti effect is a voltage increase toward the cable ends at no load operation. The compensating circuits illustrated in FIG. 1 comprise a compensating inductor 9 connected in series circuit arrangement with a compensating capacitor 10 between the superconductive cable 1 and a point at ground potential, and a compensating inductor 9' connected in series circuit arrangement with a compensating capacitor 10' between said cable and a point at ground potential.

The utilization of the DC transmission device of the present invention, including the voltage dividers and the compensating circuits, requires considerably less operating expense in cooling or dissipating dielectric upper harmonic wave losses than does the utilization of enlarged cooling plants. The DC resistance of the grounded series circuit part of a voltage divider may preferably amount to 100 or more times the DC resistance of the part of the voltage divider which comprises the smoothing inductor coupled between the corresponding converter and the superconductive cable 1. The capacitive reactance of the capacitors 7a, 7a', 7b and 7b' of the voltage dividers and of the capacitors 10 and 10' of the compensating circuits should be less at the considered upper harmonic frequencies than the inductive reactance of the inductors 8a, 8a', 8b and 8b' of the voltage dividers and of the inductors 9 and 9' of the compensating circuits.

Figure 2:
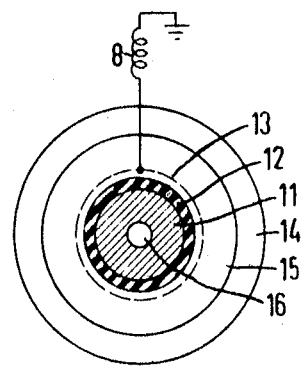
FIG. 2 is a cross-sectional view of the superconductive cable of FIG. 1.

The capacitors 7a, 7a', 7b, 7b', 10 and 10' may be formed in the superconducting cable 1 by the electrical insulation material therein and normally conductive material therein. Such capacitors may be connected to ground via the inductors 8a, 8a', 8b, 8b', 9 and 9', respectively, connected between the normally conductive material of the superconducting cable 1 and ground. A cross section of such a superconducting cable is shown in FIG. 2.

of FIG. 2, an inductor 8, which represents any of the inductors 8a, 8a', 8b and 8b' of the voltage dividers or the inductor 9 or 9' of the compensating circuits, is connected between the cable and ground via a capacitor formed by the components of the cable itself. The cable comprises superconducting material 11. The superconducting material 11 is covered by electrically insulating material 12. Normally conductive material 13 covers the electrically insulating material 12. The normally conductive material 13 is covered by a thermal insulation 14. A space or gap 15 is provided between the normally conducting material 13 and the thermal insulation 14. A space or gap 16 is provided at the axial center of the cable within the superconducting material 11. The gaps 15 and 16 are utilized for cooling the cable.

The capacitor, which is any of the capacitors 7a, 7a', 7b, 7b', 10 and 10', comprises the normally conductive material 13, the electrically insulating material 12 and the superconductive material 11. The electrically insulating material 12 functions as the dielectric material in separating the superconductive material 11 and the normally conductive material 13. In accordance with the present invention, the normally conductive material 13 is provided in an axial length which is sufficient to provide the desired capacitance. The normally conductive material 13 may be electrically isolated, insulated or separated from the remaining grounded material of the cable and is coupled to a point at ground potential via the inductor 8.

While the invention has been described by means of a specific example and in a specific embodiment, I do not wish to be limited thereto, for obvious modifications will occur to those skilled in the art without departing from the spirit and scope of the invention.

I claim:

1. A DC transmission device for a superconductive cable having two ends, said transmission device comprising
   current converter means coupled to each end of said cable, said current converter means producing an upper harmonic voltage; and
   voltage divider means interposed and coupled between each end of said cable and the corresponding current converter means for decreasing the upper harmonic voltage at said cable to a fraction of the upper harmonic voltage at said current converter means, each of said voltage divider means having a part having a low resistance to direct current coupled in series between the corresponding end of the cable and the corresponding current converter means and another part having a high resistance to direct current and being connected between the corresponding end of the cable and a point at ground potential whereby the voltage at said cable is substantially unaffected by said voltage divider means.

2. A DC transmission device as claimed in claim 1, further comprising compensating means connected to said cable at intervals of less than one-quarter wavelength.

3. A DC transmission device as claimed in claim 1, further comprising compensating means comprising a plurality of compensators each comprising a capacitor and an inductor connected in series circuit arrangement between said cable and a point at ground potential.

4. A DC transmission device for a superconductive cable having two ends, said transmission device comprising
   current converter means coupled to each end of said cable, said current converter means producing an upper harmonic voltage; and
   voltage divider means interposed and coupled between each end of said cable and the corresponding current converter means for decreasing the upper harmonic voltage at said cable to a fraction of the upper harmonic voltage at said current converter means, each of said voltage divider means having a smoothing inductance having a low resistance to direct current coupled in series between the corresponding end of the cable and the corresponding current converter means and an inductive reactance and a capacitive reactance having a high resistance to direct current and being connected between the corresponding end of the cable and a point at ground potential whereby the voltage at said cable is substantially unaffected by said voltage divider means.

5. A DC transmission device for a superconductive cable having two ends, said transmission device comprising
   current converter means coupled to each end of said cable, said current converter means producing an upper harmonic voltage; and voltage divider means comprising a plurality of voltage dividers interposed and coupled between each end of said cable and the corresponding current converter means for decreasing the upper harmonic voltage at said cable to a fraction of the upper harmonic voltage at said current converter means, each of said voltage divider means having a smoothing inductor connected between an end of said cable and a current converter means and a capacitor and an inductor connected in series circuit arrangement between an end of the cable and a point at ground potential whereby the voltage at said cable is substantially unaffected by said voltage divider means.

6. A DC transmission device as claimed in claim 12, wherein the smoothing inductor of each voltage divider couples the corresponding voltage divider to said current converter means.

7. A DC transmission device as claimed in claim 5, wherein said cable comprises superconductive material, electrically insulating material covering said superconductive material and normally conductive material covering said insulating material, the capacitor of each of said voltage dividers comprising said superconductive, insulating and normally conductive materials.

8. A DC transmission device as claimed in claim 7, wherein the capacitor of each of said compensators also comprises said superconductive, insulating and normally conductive materials.

9. A DC transmission device for a superconductive cable having two ends, said transmission device comprising current converter means coupled to each end of said cable, said current converter means producing an upper harmonic voltage;

voltage divider means comprising a plurality of voltage dividers interposed and coupled between each end of said cable and the corresponding current converter means for decreasing the upper harmonic voltage at said cable to a fraction of the upper harmonic voltage at said current converter means, each of said voltage divider means having a smoothing inductor connected between an end of said cable and a current converter means and a capacitor and an inductor connected in series circuit arrangement between an end of the cable and a point at ground potential whereby the voltage at said cable is substantially unaffected by said voltage divider means; and compensating means comprising a plurality of compensators each comprising a capacitor and an inductor connected in series circuit arrangement between said cable and a point at ground potential.

10. A DC transmission device for a superconductive cable comprising superconductive material, electrically insulating material covering said superconductive material and normally conductive material covering said insulating material, said cable having two ends, said transmission device comprising current converter means coupled to each end of said cable, said current converter means producing an upper harmonic voltage;

voltage divider means interposed and coupled between each end of said cable and the corresponding current converter means for decreasing the upper harmonic voltage at said cable to a fraction of the upper harmonic voltage at said current converter means, each of said voltage divider means having a smoothing inductance having a low resistance to direct current coupled in series between the corresponding end of the cable and the corresponding current converter means and an inductive reactance and a capacitive reactance having a high resistance to direct current and being connected between the corresponding end of the cable and a point at ground potential whereby the voltage at said cable is substantially unaffected by said voltage divider means; and compensating means comprising a plurality of compensators each comprising a capacitor and an inductor connected in series circuit arrangement between said cable and a point at ground potential, the capacitor of each of said compensators comprising said superconductive, insulating and normally conductive materials.